United States Patent [19] | [11] Patent Number: 5,074,433
Cargill et al. | [45] Date of Patent: Dec. 24, 1991

[54] DOCUMENT DELIVERY AND ABORT MECHANISM

[75] Inventors: N. Allen Cargill; Chester J. Koenig, both of Warminster, Pa.

[73] Assignee: Technitrol, Inc., Philadelphia, Pa.

[21] Appl. No.: 445,024

[22] Filed: Dec. 4, 1989

[51] Int. Cl.[5] .............................................. B65G 59/00
[52] U.S. Cl. ....................................... 221/256; 221/21
[58] Field of Search ................. 221/21, 236, 248, 255, 221/256, 257, 266, 277; 271/207; 194/DIG. 26

[56] References Cited

U.S. PATENT DOCUMENTS 3,199,724 8/1965 Domenico et al. ................. 221/257
4,020,972 5/1977 Lundblad .............................. 221/21
4,450,978 5/1984 Graef et al. ........................... 221/21

FOREIGN PATENT DOCUMENTS 130111 7/1919 United Kingdom ................ 221/256

*Primary Examiner*—Robert P. Olszewski
*Assistant Examiner*—Kenneth Noland
*Attorney, Agent, or Firm*—John F. A. Earley; John F. A. Earley, III

[57] ABSTRACT

A document delivery and abort mechanism 11 for an automatic document dispensing machine 13 for dispensing currency comprises an accept door 15 for dispensing documents from automatic document dispensing machine 13, a power shaft 17 which operates in response to signals from the automatic document dispensing machine to open the accept door 15 or abort delivery of the currency, an accept door opening mechanism connected between power shaft 17 and accept door 15 for opening accept door 15, a locking mechanism for preventing rotation of the power shaft in a direction that opens the accept door 15 for locking accept door 15 in a closed position, when desired, and an abort door connected to power shaft 17 for aborting delivery of the currency when it has been processed incorrectly.

9 Claims, 5 Drawing Sheets

DOCUMENT DELIVERY AND ABORT MECHANISM

BACKGROUND OF THE INVENTION

1. Field of the Invention

This invention relates to automatic document dispensing machines for dispensing documents such as paper money, and more particularly concerns a document delivery and abort mechanism for an automatic document dispensing machine for dispensing or aborting delivery of paper money, as at a machine for returning the paper money portion of change from a vending machine.

SUMMARY OF THE INVENTION

It is an object of this invention to provide a document delivery and abort mechanism for an automatic document dispensing machine, that dispenses documents, such as paper money, when the documents have been processed correctly, and that aborts the dispensing of any documents when the documents have been processed incorrectly.

Another object of this invention is to provide a document delivery and abort mechanism that is actuated simply by rotating a power shaft clockwise or counterclockwise, with a total rotation of about 180 degrees.

Another object of this invention is to provide a document delivery and abort mechanism having an accept door that locks when closed so the accept door cannot be pulled open.

Another object is to provide an accept door that, when locked, places no rotational load on the power shaft, which allows for the use of light-weight construction materials for the power shaft and the control mechanisms.

Still another object of the invention is to provide a document delivery and abort mechanism having an accept door that remains closed when an abort door opens and closes.

A further object of the invention is to provide a document delivery and abort mechanism having an accept door that, when in a standard open position, may be pulled opened farther to a wide open position without damage to the power shaft, and that may be returned to its original open position by discontinuing the pulling on the accept door which allows the door to spring back to its standard open position.

These and other objects are accomplished by providing a document delivery and abort mechanism for an automatic document dispensing machine or the like, that comprises an accept door or access door for dispensing documents from the dispensing machine, a power shaft which rotates in response to signals from the dispensing machine to open the access door and permit it to close when desired, accept door opening means connected between the power shaft and the accept door for opening the accept door, and locking means for locking the door in closed position. An abort door is provided which is normally connected at right angles to the access door, but which may be opened by the power shaft to drop an incorrect dispense into an escrow bin or lockable compartment.

DETAILED DESCRIPTION

Figure 1:
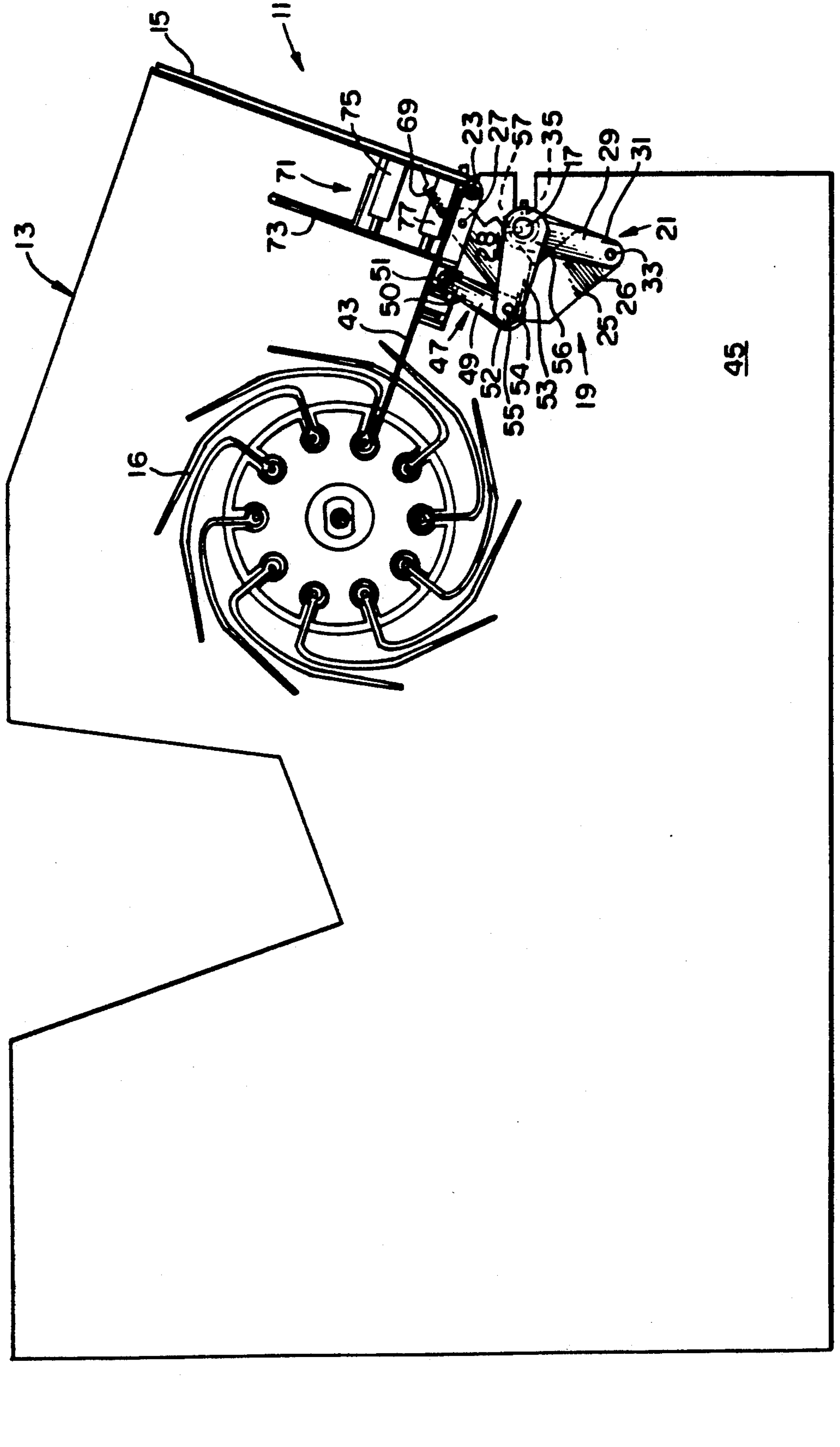
FIG. 1 is a side view in elevation of a document delivery and abort mechanism in an automatic document dispensing machine with its accept door in a closed position and its abort door in a closed position.

Turning to the drawings, there is shown in FIGS. 1-3 and 8 a document delivery and abort mechanism 11 for an automatic document dispensing machine 13, that comprises an accept door 15 that opens for dispensing documents from automatic document dispensing machine 13 after a stacker wheel 16 rotates and delivers to it documents such as paper money, a power shaft 17 that controls the opening of accept door 15, accept door opening means 19 mounted on the power shaft 17 and connected to the accept door 15 for opening accept door 15, and locking means 21 for locking the accept door 15 in a closed position by preventing rotation of the power shaft 17 in a direction that opens accept door 15.

Automatic document dispensing machine 13 is shown and described in Technitrol U.S. Pat. No. 4,691,910, issued Sept. 8, 1987, which is incorporated herein by reference, and dispensing machine 13 includes processing mechanism 20 (FIG. 8) and power supply mechanism 22.

Figure 2:
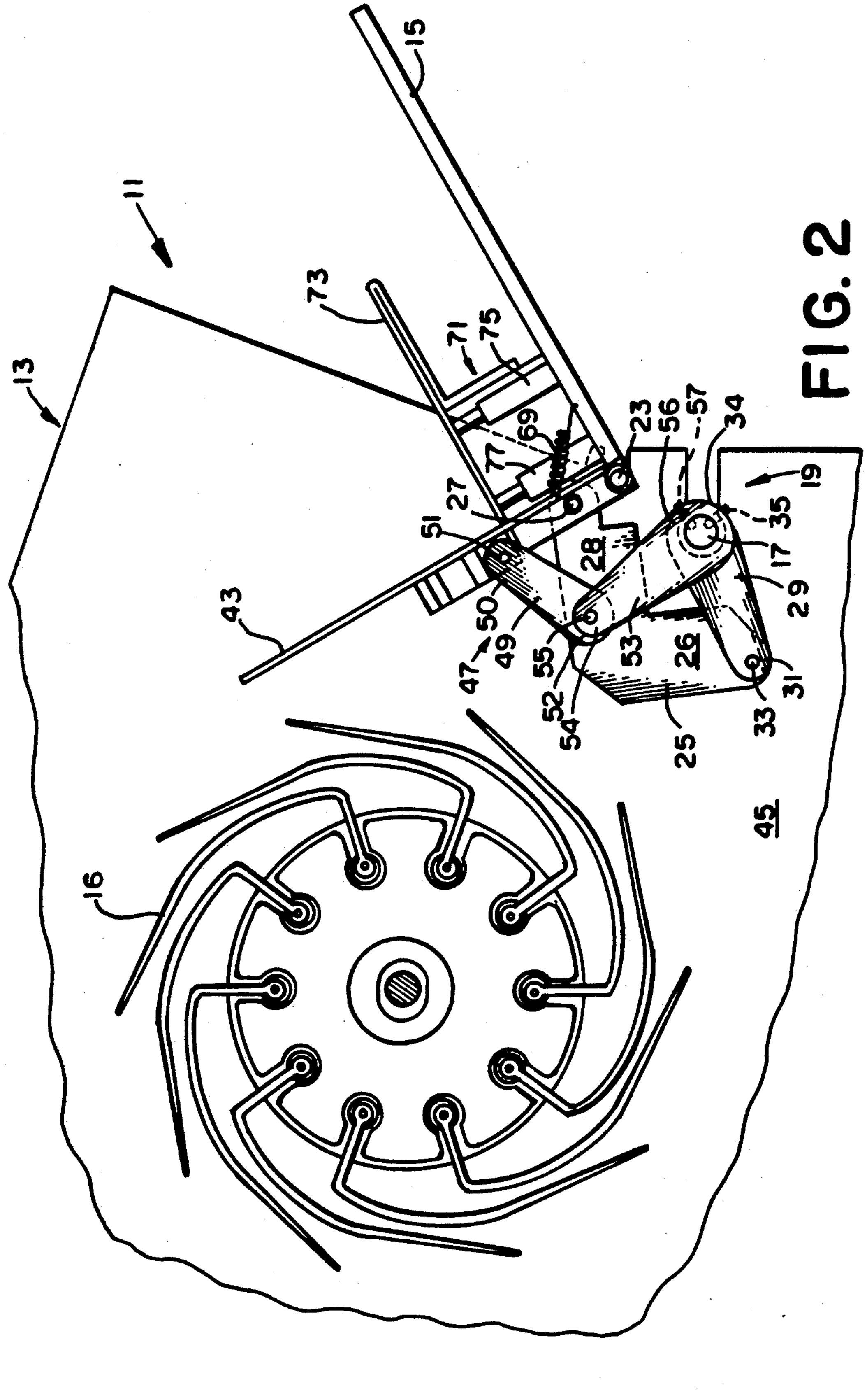
FIG. 2 is a side view in elevation of the mechanism of FIG. 1 with its accept door in an open position.

Accept door 15 is mounted in automatic document dispensing machine 13 o a pivot pin 23 and may be tilted outwardly from its closed position in FIG. 1 to the open position of FIG. 2 to dispense documents therefrom if the dispense is without error, that is, if the documents have been correctly processed in automatic document dispensing machine 13 and correctly delivered to accept door 15 for dispensing. Dispensing machine 13 is provided with an error detection mechanism that checks the accuracy of each dispense before the dispense is dispensed from machine 13.

Power shaft 17 is mounted in automatic document dispensing machine 13 below accept door 15, and rotation of power shaft 17, in response to a signal from machine 13, drives the accept door opening means 19 to open the accept door 15.

Accept door opening means 19 has an L-shaped attachment link 25 that is pivotally mounted at one end 28 to a pivot pin 27 mounted on accept door 15 and is pivotally attached at its other end 26 to drive link 29 at its end 31 to pivot pin 33. The other end 34 of drive link 29 is connected to power drive or drive shaft 17 and is rotated by shaft 17 to rotate link 25 to open door 15.

Figure 5:
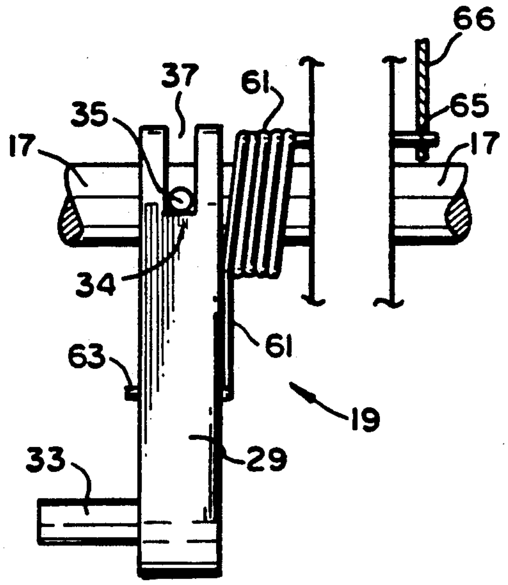
FIG. 5 is a partial view in elevation of the mechanism of FIG. 1, and shows an accept door return spring and an accept door drive link connected to the power shaft.
Figure 7:
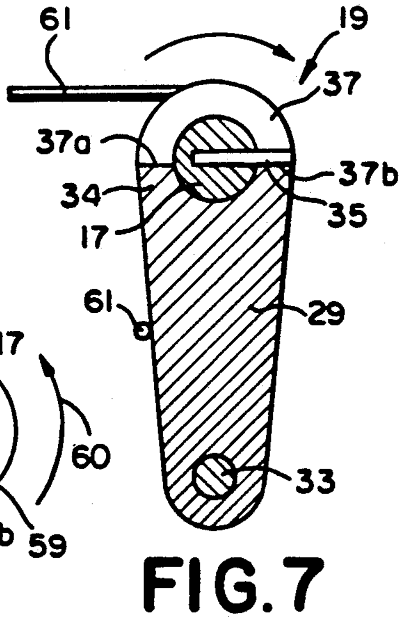
FIG. 7 is a view in section of the power shaft with an accept door drive link and accept door return spring connected thereto.
Figure 8:
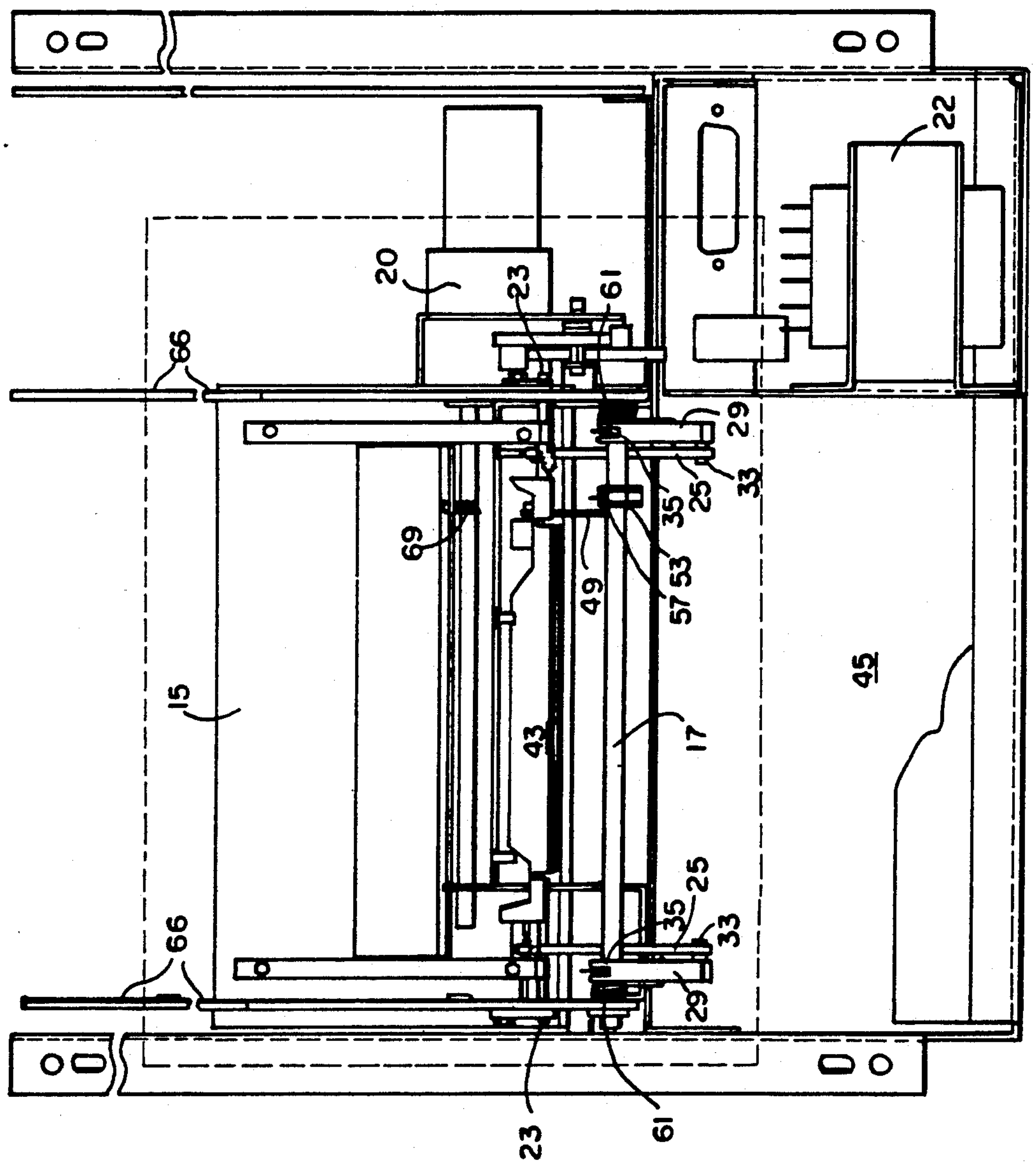
FIG. 8 is a front view in elevation of the document delivery and abort mechanism with its accept door in a closed position and its abort door in a closed position.

Referring to FIGS. 5 and 7, accept door opening means 19 includes a crank pin 35 radially mounted on power shaft 17 that fits into a slot 37 in end 34 of door drive link 29.

Slot 37 is in the form of a 180 degree annular groove around circumference of power shaft 17 which allows crank pin 35 to rotate freely between bases 37*a* and 37*b* of slot 37. Preferably, slot 37 is about 0.093 inches wide, and crank pin 35 is about 0.078 inches in diameter so as to provide working clearance between crank pin 35 and the side walls of slot 37. As shown in FIG. 1, the accept door 15 is closed, and the position of crank pin 35 on power shaft 17 is at about 3 o'clock near base 37*b* (FIG. 7) of slot 37. As power shaft 17 rotates clockwise to open accept door 15 (FIG. 2), crank pin 35 rotates to about 6 o'clock rotating drive link 29 with it, which pushes attachment link 25 to open accept door 15.

Figure 4:
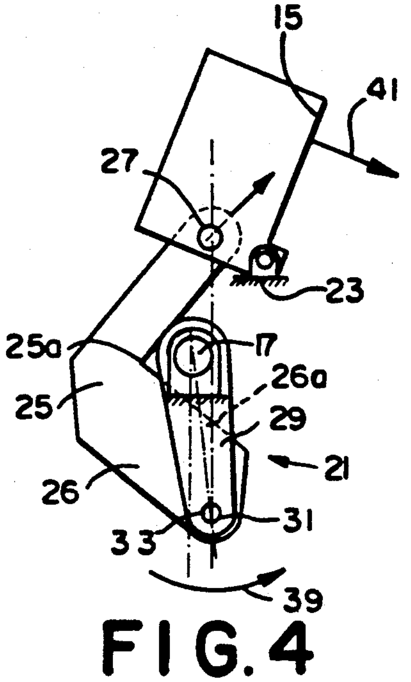
FIG. 4 is a side view in elevation showing locking means for locking the accept door in closed position.

To lock the door 15 in closed position and prevent the door from being pulled open, the shaft 17 is locked in position by links 25 and 29. Referring to FIG. 5, a spring 61 is mounted around power shaft 17, and has a first end portion 63 attached to accept door drive link 29 and a second end portion 65 attached to the frame 66 of dispensing machine 13. The spring force of spring 61 urges drive link 29 counterclockwise placing end 31 of drive link 29 over center, that is, placing a center line between pivot 27 at accept door 15 and pivot pin 33 to the right of power shaft 17. Referring to FIG. 4, when a force 41 is applied to accept door 15 in an attempt to pull open the closed door 15, the edge 26*a* of end 26 of door attachment link 25 which is attached between door 15 and pivot pin 33 of link 29, is pulled towards, and eventually into contact with (at area 25*a* of link 25), power shaft 17. As this happens, the upward movement of edge 26*a* of end 26 of link 25 pulled by the force 41 on door 15 toward power shaft 17 causes end 31 of link 29 to move in the direction indicated by arrow 39 of FIG. 4, and this direction of movement holds the door 15 closed. The greater the pulling force 41 on door 15 to force open the closed door 15, the greater the rotational force 39 on end 31 of link 29 in the direction that holds accept door 15 closed.

An abort door 43 (FIGS. 1-3) is also pivotally mounted in the automatic document dispensing machine 13 on pivot pin 23 near accept door 15. Documents may be dropped into a lockable drawer, compartment or escrow bin 45 (FIGS. 1-3) when abort door 43 is open if there is error in the processing of the documents in the automatic document dispensing machine 13. Abort door 43 is shown closed in FIG. 1 and open in FIG. 3.

Abort door opening means 47 (FIGS. 1-3) connects power shaft 17 to the abort door 43 so that rotation of power shaft 17 opens abort door 43 and permits it to close in response to signals from the mechanism 13. Abort door opening means 47 has an abort door attachment link 49 with one end 50 connected to abort door 43 at pivot pin 51 and its other end 52 pivotally connected to link 53 at pivot pin 55. The abort door link 53 is pivotally connected at one end 54 to end 52 of link 49 and at its other end 56 to power shaft 17.

Figure 6:
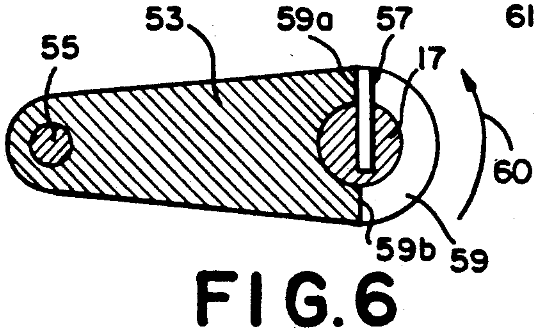
FIG. 6 is a view in section of the power shaft with an abort door drive link connected thereto.

Referring to FIG. 6, the abort door opening means 47 includes a crank pin 57 radially mounted on power shaft 17 which fits into a slot 59 formed in abort door drive link 53. Crank pin 57 rotates counterclockwise, arrow 60, to open abort door 43, and crank pin 57 is rotated clockwise to allow spring 69 to close abort door 43.

The sides of slot 59 form half of an annular ring around power shaft 17 for 180 degree rotation of shaft 17 without interference by crank pin 57.

Figure 3:
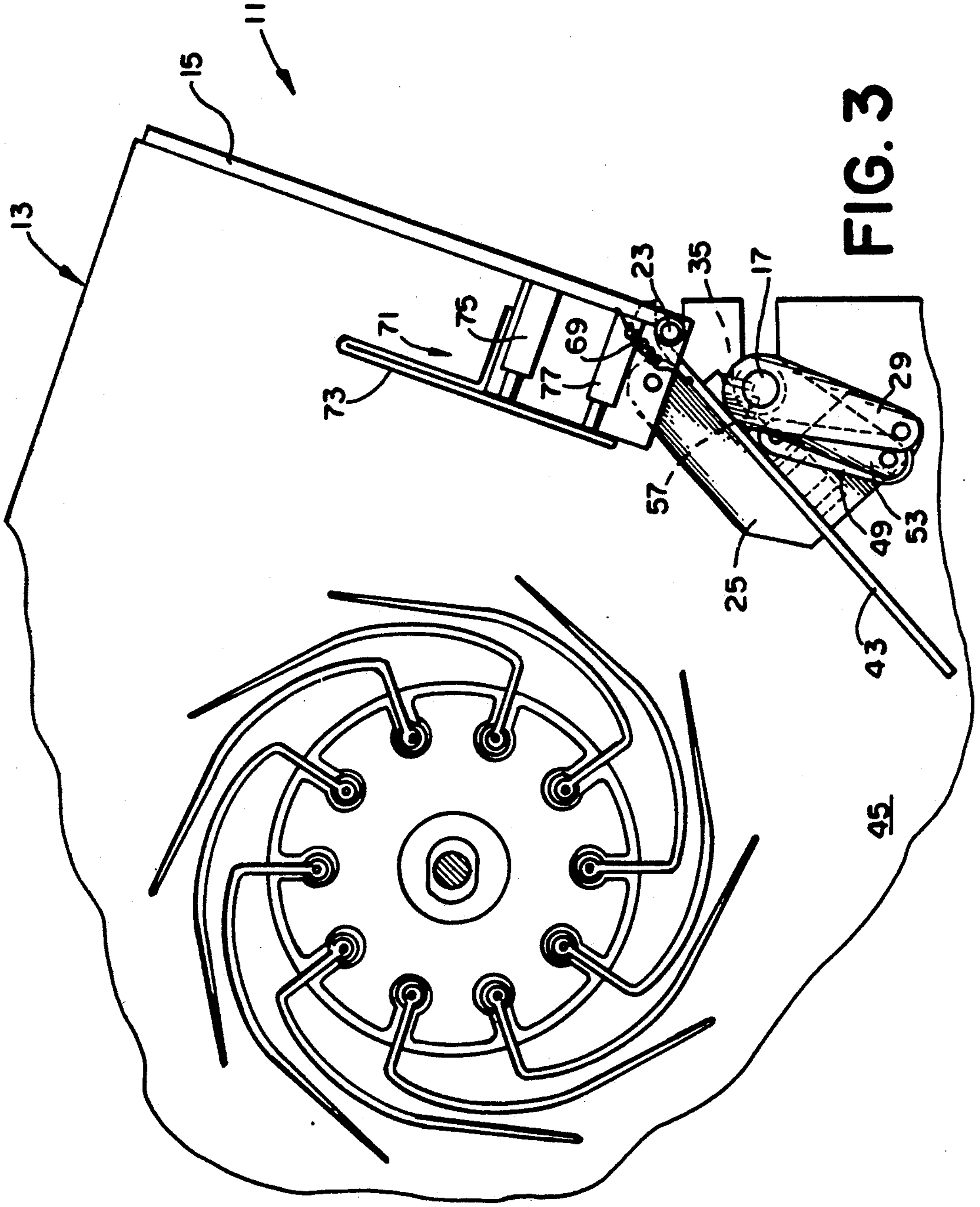
FIG. 3 is a side view in elevation of the mechanism of FIG. 1 with the accept door closed and the abort door open.

In operation, power shaft 17 is rotated counterclockwise by a signal from machine 13, as shown by arrow 60 in FIG. 6, to swing link 53 counterclockwise and pull link 49 downwardly to open abort door 43. FIG. 1 shows abort door closed, and FIG. 3 shows abort door 43 open. As shown in FIG. 1, the crank pin 57 on power shaft 17 is at about 12 o'clock near base 59*a* (FIG. 6) of slot 59. As power shaft 17 rotates counterclockwise to open abort door 43 (FIG. 3), crank pin 57 rotates to about 9 o'clock rotating drive link 53 with it, which pulls attachment link 49 downwardly to open abort door 43.

As shown in FIG. 5, the spring force of spring 61 opposes the opening of accept door 15, and does more than just balance the forces on accept door 15 in closed position, and spring 61 loads or urges the crank pin 35 of power shaft 17 against the base 37*b* of slot 37. This spring force pulls the accept door 15 closed when power shaft 17 returns to an accept door closed position as shown in FIGS. 7, 1, and 4.

Extension spring 69 (FIGS. 1-3 and 8) may be attached at one end to abort door 43 and at the other end to accept door 15 to close abort door 43 at right angles to the accept door 15 as shown in FIG. 1.

In operation, stacker wheel 16 (FIG. 1) rotates and delivers documents such as paper money onto abort door 43. If the documents have been correctly processed in the automatic document dispensing machine 13, power shaft 17 (FIG. 7) turns clockwise in the accept door opening direction so that crank pin 35, in contact with base 37*b* of slot 37, rotates drive link 29 clockwise to open the door 15. Power shaft 17 continues to rotate clockwise in door opening direction which rotates link 29 in a clockwise direction, causing attachment link 25 to rotate clockwise until accept door 15 opens by pivoting clockwise on pivot pin 23 to allow the customer to reach through the door 15 and pick up the money.

When accept door 15 is open, it may be opened farther by pulling accept door 15 downwardly to exert more pressure against spring 61. When the customer removes his hand from pulling on door 15, spring 61 returns accept door 15 to its original open position. The spring action of spring 61 prevents damage occurring to power shaft 17 and the control mechanisms connected to shaft 17 when a customer opens accept door 15 wider than its original standard open position.

When the documents have been withdrawn by the customer, power shaft 17 is rotated counterclockwise to close the door 15 in response to signals from machine 13, and crank pin 35 assumes its original position at 3 o'clock position in contact with base 37*b* of slot 37.

Accept door 15 is closed, not by the rotation of power shaft 17, but by spring 61, which exerts its pressure against the link 29 to force end 31 of link 29 counterclockwise from 9 o'clock into its position at 6 o'clock (FIG. 1) to close the accept door 15.

If the documents have been incorrectly processed, this is sensed by automatic document dispensing machine 13 which signals power shaft 17 which is rotated counterclockwise by the signal from machine 13 so that crank pin 57, in contact with base 59*a* of slot 59, rotates abort door drive link 53 counterclockwise, which pulls abort door attachment link 49 and abort door 43 downwardly to open the abort door 40, as shown in FIG. 2, until the incorrect dispense resting on abort door 43 slides off abort doors 43 and drop into the drawer 45.

After the aborted documents slide into the drawer 45, power shaft 17 is rotated in an abort door closing direction, clockwise in FIG. 6, to return abort door 43 to the currency accept position of FIG. 1. When abort door drive link 53 is disengaged from power shaft 17, the extension spring 69 attached between accept door 15 and abort door 43 pulls abort door 43 back to its right angle position with respect to accept door 15 as shown in FIG. 1.

When accept door 15 is closed (FIG. 1) and abort door 17 is in its currency accepting position of FIG. 1, crank pin 35 is in contact with base 37*b* of slot 37 and crank pin 35 is positioned at 3 o'clock, and crank pin 57 is in contact with base 59*a* in slot 59 of abort door drive link 53 and crank pin 57 is positioned at 12 o'clock.

When accept door 15 is being opened, crank pin 57 rotates clockwise with power shaft 17 and does not interfere with the clockwise rotation of abort door drive link 53 as it is being pulled upwardly by abort door attachment link 49 and abort door 43.

While abort door 43 opens and closes, the accept door 15 remains closed, and the crank pin 35 does not engage a base of slot 37.

A detecting mechanism 71 is mounted near doors 15 and 43 on housing 73 for detecting and signaling when doors 15 and 43 are closed, and detecting mechanism 71 includes a photocell 75 and a microswitch 77.

ADVANTAGES

The angular location of crank pins 35 and 57 on power shaft 17 sets the drive timing of the mechanism. Crank pins 35 and 57 are positioned so that accept door 15 and abort door 43 may be opened and closed without power shaft 17 rotating more than 180 degrees.

When accept door 15 is in its standard open position, it may be opened even farther by pulling on the accept door without causing damage to the power shaft 17 or its control mechanisms.

When accept door 15 is closed, it places no rotational load on power shaft 17. Accordingly, light-weight construction materials may be used for power shaft 17 and the control mechanisms.

Due to the positioning of the accept door attachment link 25 and the accept door drive link 29 with respect to the power shaft 17, force applied to accept door 15 in an attempt to force open the closed accept door 15 causes the accept door attachment link 25 to be pulled towards and in contact with power shaft 17 which causes accept door drive link 31 to move in a direction that is opposite that necessary to open accept door 15, thereby creating a locking mechanism.

We claim:

1. A door mechanism for an automatic document dispensing machine and the like comprising an accept door pivotally mounted in the automatic document dispensing machine for dispensing documents from the machine, a power shaft mounted in the automatic document dispensing machine which is adapted to be rotated by signals from the automatic document dispensing machine, accept door opening means mounted on the power shaft and connected to the accept door for opening the accept door, and locking means operatively connected to the power shaft for preventing rotation of the power shaft in a direction that opens the accept door to lock the accept door in a closed position when desired.

2. The mechanism of claim 1, further comprising spring means attached to the locking means for pulling the accept door closed when the power shaft rotates to an accept door closed position.

3. A door mechanism for an automatic document dispensing machine and the like comprising an accept door pivotally mounted in the automatic document dispensing machine for dispensing documents from the machine, a power shaft mounted in the automatic document dispensing machine which is adapted to be rotated by signals from the automatic document dispensing machine, accept door opening means mounted on the power shaft and connected to the accept door for opening the accept door, and locking means operatively connected to the power shaft for preventing rotation of the power shaft in a direction that opens the accept door to lock the accept door in a closed position when desired, the accept door opening means including an accept door attachment link having a first end portion pivotally mounted on the accept door and a second end portion pivotally attached to an accept door drive link, pivot means mounted on the accept door and connected to the first end portion for pivotally connecting the attachment link to the accept door, the accept door drive link having a first end portion pivotally mounted on the second end portion of the accept door attachment link and a second end portion pivotally mounted on the power shaft, a crank pin radially mounted on the power shaft, and a slot formed in the first end portion of the drive link for accepting the crank pin, the slot extending only about halfway around the circumference of the power shaft.

4. A door mechanism for an automatic document dispensing machine and the link comprising an accept door pivotally mounted in the automatic document dispensing machine for dispensing documents from the machine, a power shaft mounted in the automatic document dispensing machine which is adapted to be rotated by signals from the automatic document dispensing machine, accept door opening means mounted on the power shaft and connected to the accept door for opening the accept door, and locking means operatively connected to the power shaft for preventing rotation of the power shaft in a direction that opens the accept door to lock the accept door in a closed position when desired, the locking means including an accept door attachment link having a first end portion and a second end portion, the accept door attachment link first end portion being pivotally mounted on the accept door, an accept door drive link having a first end portion and a second end portion, the accept door drive link first end portion being pivotally mounted on the power shaft, the accept door drive link second end portion being pivotally mounted on the accept door attachment link second end portion, and means connected to the drive link and the attachment link for responding to a force being applied on the accept door in an attempt to force the accept door open when it is closed and for rotating the second end portion of the drive link around the power shaft in a direction opposite that needed to open the accept door.

5. A door mechanism for an automatic document dispensing machine and the like comprising an accept door pivotally mounted in the automatic document dispensing machine for dispensing documents from the machine, a power shaft mounted in the automatic document dispensing machine which is adapted to be rotated by signals from the automatic document dispensing machine, accept door opening means mounted on the power shaft and connected to the accept door for opening the accept door; and locking means operatively connected to the power shaft for preventing rotation of the power shaft in a direction that opens the accept door to lock the accept door in a closed position when desired, further including an abort door pivotally mounted in the automatic document dispensing machine adjacent to the accept door through which documents may be dropped into a compartment inside the automatic document dispensing machine if there is an error in the processing of the documents, and abort door opening means mounted on the power shaft and connected to the abort door for opening the abort door.

6. A door mechanism for an automatic document dispensing machine and the like comprising an accept door pivotally mounted in the automatic document dispensing machine for dispensing documents from the machine, a power shaft mounted in the automatic document dispensing machine which is adapted to be rotated by signals from the automatic document dispensing machine, accept door opening means mounted on the power shaft and connected to the accept door for opening the accept door, and locking means operatively connected to the power shaft for preventing rotation of the power shaft in a direction that opens the accept door to lock the accept door in a closed position when desired, the abort door opening means including an abort door attachment link having a first end portion and a second end portion, the abort door attachment link first end portion being pivotally mounted on the abort door, an abort door drive link having a first end portion and a second end portion, the abort door drive link first end portion being pivotally mounted on the power shaft, the abort door drive link second end portion being pivotally mounted on the abort door attachment link second end portion, a crank pin radially mounted on the power shaft and positioned in a slot formed in the first end portion of the abort door drive link, the slot extending only about half way around the circumference of the power shaft.

7. A door mechanism for an automatic document dispensing machine and the like, comprising an accept door pivotally mounted in the automatic document dispensing machine for dispensing documents from the machine, a power shaft mounted in the automatic document dispensing machine which is adapted to be rotated by signals from the automatic document dispensing machine, accept door opening means mounted on the power shaft and connected to the accept door for opening the accept door, and locking means operatively connected to the power shaft for preventing rotation of the power shaft in a direction that opens the accept door to lock the accept door in a closed position when desired, the accept door opening means including an accept door attachment link having a first end portion pivotally mounted on the accept door and a second end portion pivotally attached to an accept door drive link, pivot means mounted on the accept door and connected to the first end portion for pivotally connecting the attachment link to the accept door, the accept door drive link having a first end portion pivotally mounted on the second end portion of the accept door attachment link and a second end portion pivotally mounted on the power shaft, a crank pin radially mounted on the power shaft, and a slot formed in the first end portion of the drive link for accepting the crank pin, the slot extending only about halfway around the circumference of the power shaft, the locking means including means connected to the drive link and the attachment link for responding to a force being applied on the accept door in an attempt to force the accept door open when it is closed and for rotating the second end portion of the drive link around the power shaft in a direction opposite that needed to open the accept door, an abort door pivotally mounted in the automatic document dispensing machine adjacent to the accept door through which documents may be dropped into a compartment inside the automatic document dispensing machine if there is an error in the processing of the documents, abort door opening means mounted on the power shaft and connected to the abort door for opening the abort door, the abort door opening means including an abort door attachment link having a first end portion and a second end portion, the abort door attachment link first end portion being pivotally mounted on the abort door, an abort door drive link having a first end portion and a second end portion, the abort door drive link first end portion being pivotally mounted on the power shaft, the abort door drive link second end portion being pivotally mounted on the abort door attachment link second end portion, a second crank pin radially mounted on the power shaft and positioned in a slot formed in the first end portion of the abort door drive link, the slot extending only about half way around the circumference of the power shaft, and spring means attached to the locking means for pulling the accept door closed when the power shaft rotates to an accept door closed position.

8. An automatic document dispensing machine for dispensing documents such as paper money, comprising a frame, a processing mechanism mounted in the frame for processing the documents, an accept door pivotally mounted on the frame for dispensing documents from the machine, a power shaft mounted on the frame which is adapted to be rotated by signals from the processing mechanism, accept door opening means mounted on the power shaft and connected to the accept door for opening the accept door, and locking means operatively connected to the power shaft for preventing rotation of the power shaft in a direction that opens the accept door to lock the accept door in a closed position when desired.

9. An automatic document dispensing machine for dispensing documents such as paper money, comprising a frame, a processing mechanism mounted in the frame for processing the documents, an accept door pivotally mounted on the frame for dispensing documents from the machine, a power shaft mounted on the frame which is adapted to be rotated by signals from the processing mechanism, accept door opening means mounted on the power shaft and connected to the accept door for opening the accept door, and locking means operatively connected to the power shaft for preventing rotation of the power shaft in a direction that opens the accept door to lock the accept door in a closed position when desired, the accept door opening means including an accept door attachment link having a first end portion pivotally mounted on the accept door and a second end portion pivotally attached to an accept door drive link, pivot means mounted on the accept door and connected to the first end portion for pivotally connecting the attachment link to the accept door, the accept door drive link having a first end portion pivotally mounted on the second end portion of the accept door attachment link and a second end portion pivotally mounted on the power shaft, a crank pin radially mounted on the power shaft, and a slot formed in the first end portion of the drive link for accepting the crank pin, the slot extending only about halfway around the circumference of the power shaft, the locking means including means connected to the drive link and the attachment link for responding to a force being applied on the accept door in an attempt to force the accept door open when it is closed and for rotating the second end portion of the drive link around the power shaft in a direction opposite that needed to open the accept door, an abort door pivotally mounted in the automatic document dispensing machine adjacent to the accept door through which documents may be dropped into a compartment inside the automatic document dispensing machine if there is an error in the processing of the documents, abort door opening means mounted on the power shaft and connected to the abort door for opening the abort door, the abort door opening means including an abort door attachment link having a first end portion and a second end portion, the abort door attachment link first end portion being pivotally mounted on the abort door, an abort door drive link having a first end portion and a second end portion, the abort door drive link first end portion being pivotally mounted on the power shaft, the abort door drive link second end portion being pivotally mounted on the abort door attachment link second end portion, a second crank pin radially mounted on the power shaft and positioned in a slot formed in the first end portion of the abort door drive link, the slot extending only about half way around the circumference of the power shaft, and spring means attached to the locking means for pulling the accept door closed when the power shaft rotates to an accept door closed position.

* * * * *